United States Patent
Okajima et al.

(10) Patent No.: US 7,464,994 B2
(45) Date of Patent: Dec. 16, 2008

(54) BICYCLE RIM REINFORCED WITH A CONTINUOUSLY EXTENDING RESIN MATERIAL

(75) Inventors: Shinpei Okajima, Izumi (JP); Takashi Yaegashi, Sakai (JP); Tsutomu Muraoka, Sakai (JP)

(73) Assignee: Shimano Inc., Osaka (JP)

( * ) Notice: Subject to any disclaimer, the term of this patent is extended or adjusted under 35 U.S.C. 154(b) by 67 days.

(21) Appl. No.: 11/366,810

(22) Filed: Mar. 3, 2006

(65) Prior Publication Data
US 2007/0205653 A1 Sep. 6, 2007

(51) Int. Cl.
*B60B 21/06* (2006.01)
*B60B 25/00* (2006.01)

(52) U.S. Cl. .............. 301/58; 301/95.102; 301/95.107

(58) Field of Classification Search .................... 301/55, 301/58, 64.704, 67, 70, 95.101, 95.102, 95.103, 301/95.104, 95.105, 95.106, 95.107, 95.108, 301/104; 29/894.33, 894.333
See application file for complete search history.

(56) References Cited

U.S. PATENT DOCUMENTS

| | | | | |
|---|---|---|---|---|
| 509,261 | A * | 11/1893 | Stall ...................... | 301/95.107 |
| 6,347,839 | B1 * | 2/2002 | Lew et al. .............. | 301/95.102 |
| 6,991,300 | B2 * | 1/2006 | Colegrove ............. | 301/95.103 |
| 7,140,695 | B2 * | 11/2006 | Passarotto ............... | 301/58 |
| 7,331,639 | B2 * | 2/2008 | Okajima ................... | 301/58 |
| 2004/0222689 | A1 | 11/2004 | Okajima | |
| 2005/0253446 | A1 | 11/2005 | Okajima | |

FOREIGN PATENT DOCUMENTS

| | | | |
|---|---|---|---|
| DE | 20 2005 016 288 U1 | | 1/2006 |
| DE | 10 2004 047 264 A1 | | 4/2006 |
| EP | 1 428 685 A2 | | 6/2004 |
| EP | 1 698 489 A2 | | 9/2006 |
| EP | 1698489 | | 9/2006 |
| JP | 60-080902 A | | 5/1985 |
| JP | 60080902 A | * | 5/1985 |
| JP | 61-125901 A | | 6/1986 |
| JP | 61244602 A | * | 10/1986 |
| JP | 62-128803 A | | 6/1987 |
| JP | 2003-260904 A | | 9/2003 |

OTHER PUBLICATIONS

Rigida Wheelsets Brochure '06, 1 page, Distributed Sep. 2005.

* cited by examiner

*Primary Examiner*—Russell D Stormer
*Assistant Examiner*—Kip T Kotter
(74) *Attorney, Agent, or Firm*—Global IP Counselors, LLP

(57) ABSTRACT

A bicycle rim is provided with an annular metallic rim member and at least one reinforcing resin material. The annular metallic rim member includes an annular tire attachment portion adapted to have a tire mounted thereon, a first annular side wall portion, a second annular side wall portion and an inner annular wall portion connecting the first and second annular side wall portions with a plurality of spoke attachment openings formed in the inner annular wall portion. The at least one reinforcing resin material is attached to the annular metallic rim member such that the reinforcing resin material continuously extends from the first annular side wall portion across the inner annular wall portion to the second annular side wall portions to overlie exterior surface areas of the first and second annular side wall portions and exterior surface areas of the inner annular wall portion around the spoke attachment openings.

16 Claims, 8 Drawing Sheets

BICYCLE RIM REINFORCED WITH A CONTINUOUSLY EXTENDING RESIN MATERIAL

BACKGROUND OF THE INVENTION

1. Field of the Invention

This invention generally relates to a bicycle rim. More specifically, the present invention relates to a reinforced bicycle rim that has an annular metallic rim member with reinforcing resin material disposed around the spoke attachment openings.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle wheel. Bicycle wheels are constantly being redesigned to be strong, lightweight and more aerodynamic in design as well as to be simple to manufacture and assemble.

There are many different types of bicycle wheels, which are currently available on the market. Most bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to holes in the rim.

Recently, bicycle wheels have been designed that have utilized spokes with higher tension between the rim and the hub to provide a more rigid wheel. When the tension in the spokes becomes very high, very strong rims are required. If the rim is made thicker over its entire circumference or a steel rim is used, then the rim may become undesirable heavy. Thus, several attempts have been made to create rims that are lightweight and can accommodate high tension spokes. One example of a bicycle rim that can accommodate high tension spokes is disclosed in U.S. Pat. No. 6,283,557, assigned to Shimano, Inc. The bicycle rim of this patent uses spokes that are attached to side surfaces of the rim by using special washers. While this rim works very well, it requires special washers that are attached to the end of the spokes with spokes having a bent end. Several bicycle wheels have been developed that use straight spokes. These straight spokes are very strong and allow for higher tension to be used in the spokes. However, again, when the tension in the straight spokes becomes very high, then very strong rims are required. As a result, thicker and/or reinforced rims are needed when using straight spokes under high tension. Some of these reinforcements are welded or brazed to the rim, which can result in the physical properties of the rim being altered by the heat of the welding or brazing process. Thus, these thicker or reinforced rims are often heavy, difficult to manufacture and/or expensive to manufacture.

In view of the above, it will be apparent to those skilled in the art from this disclosure that there exists a need for an improved reinforced rim. This invention addresses this need in the art as well as other needs, which will become apparent to those skilled in the art from this disclosure.

SUMMARY OF THE INVENTION

One object of the present invention is to provide a rim for a bicycle wheel that is relatively strong yet relatively lightweight.

Another object of the present invention is to provide a rim that is relatively simple and inexpensive to manufacture and assemble.

The foregoing objects can basically be attained by providing a bicycle rim that comprises an annular metallic rim member and at least one reinforcing resin material. The annular metallic rim member includes an annular tire attachment portion adapted to have a tire mounted thereon, a first annular side wall portion, a second annular side wall portion and an inner annular wall portion connecting the first and second annular side wall portions with a plurality of spoke attachment openings formed in the inner annular wall portion. The at least one reinforcing resin material is attached to the annular metallic rim member such that the reinforcing resin material continuously extends from the first annular side wall portion across the inner annular wall portion to the second annular side wall portions to overlie exterior surface areas of the first and second annular side wall portions and exterior surface areas of the inner annular wall portion around the spoke attachment openings.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
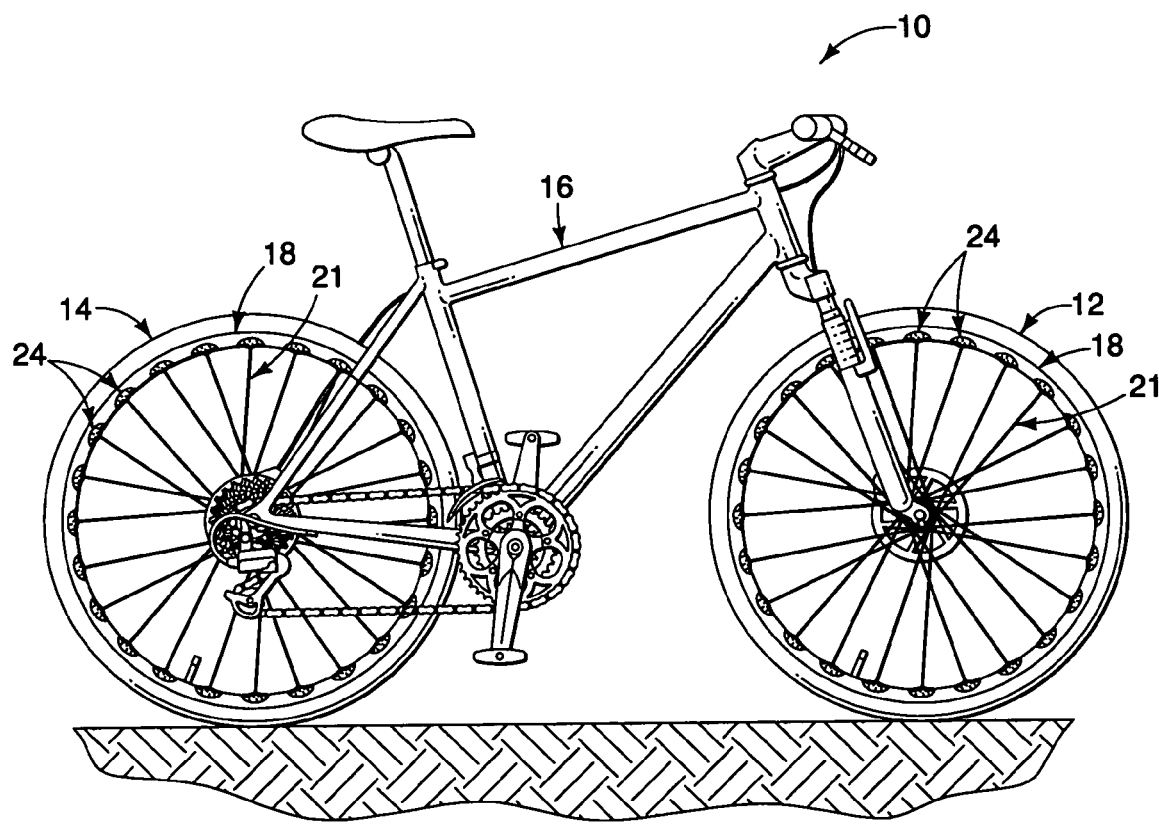
FIG. 1 is a side elevational view of a bicycle with a front bicycle wheel and a rear bicycle wheel in accordance with a first embodiment of the present invention.

Referring initially to FIG. 1, a bicycle 10 is illustrated with a front bicycle wheel 12 and a rear bicycle wheel 14 in accordance with a first embodiment of the present invention. The bicycle wheels 12 and 14 are attached to a bicycle frame 16 in a conventional manner. Since the parts of the bicycle 10 are well known in the art, the parts of the bicycle 10 will not be discussed or illustrated in detail herein, except for the parts that relate to the present invention. In other words, only the parts related to the bicycle wheels 12 and 14 will be discussed and illustrated in detail herein. Moreover, various conventional bicycle parts such as brakes, additional sprockets, derailleurs, etc., which may or may not be illustrated herein, can be used in conjunction with the present invention.

Generally, the present invention is applied in the same manner to both of the bicycle wheels 12 and 14. Also some of the parts of the bicycle wheels 12 and 14 are identical or have the same function. Thus, the identical parts of the bicycle wheels 12 and 14 will be given the same reference numerals. Referring to FIGS. 2 to 5, the front bicycle wheel 12 basically includes an annular rim 18 with a pneumatic tire 19, a center hub 20, and a plurality of spokes 21 with washers 22 disposed between the spokes 21 and the annular rim 18.

Figure 2:
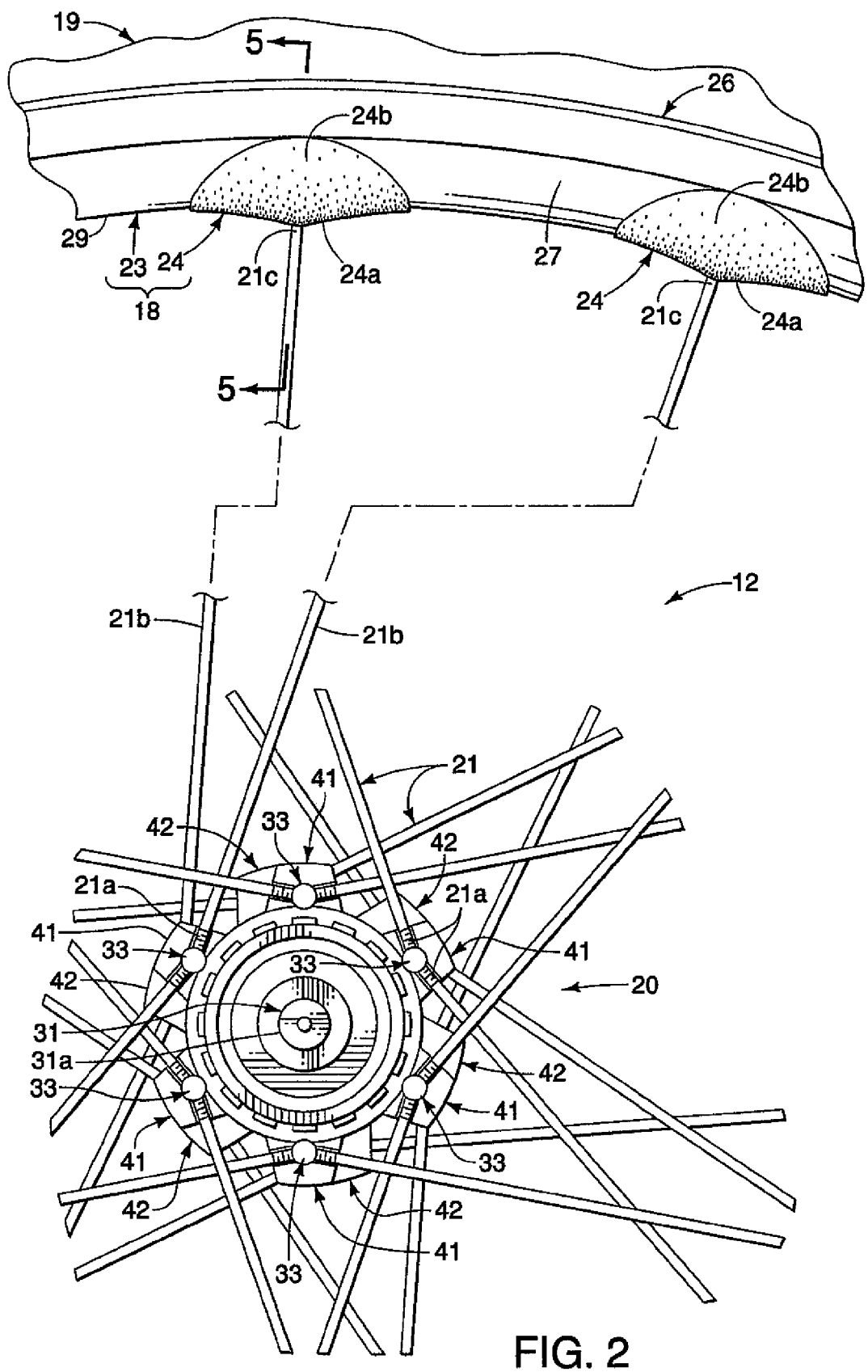
FIG. 2 is a partial side elevational view of the front wheel illustrated in FIG. 1 in accordance with the first embodiment of the present invention.
Figure 3:
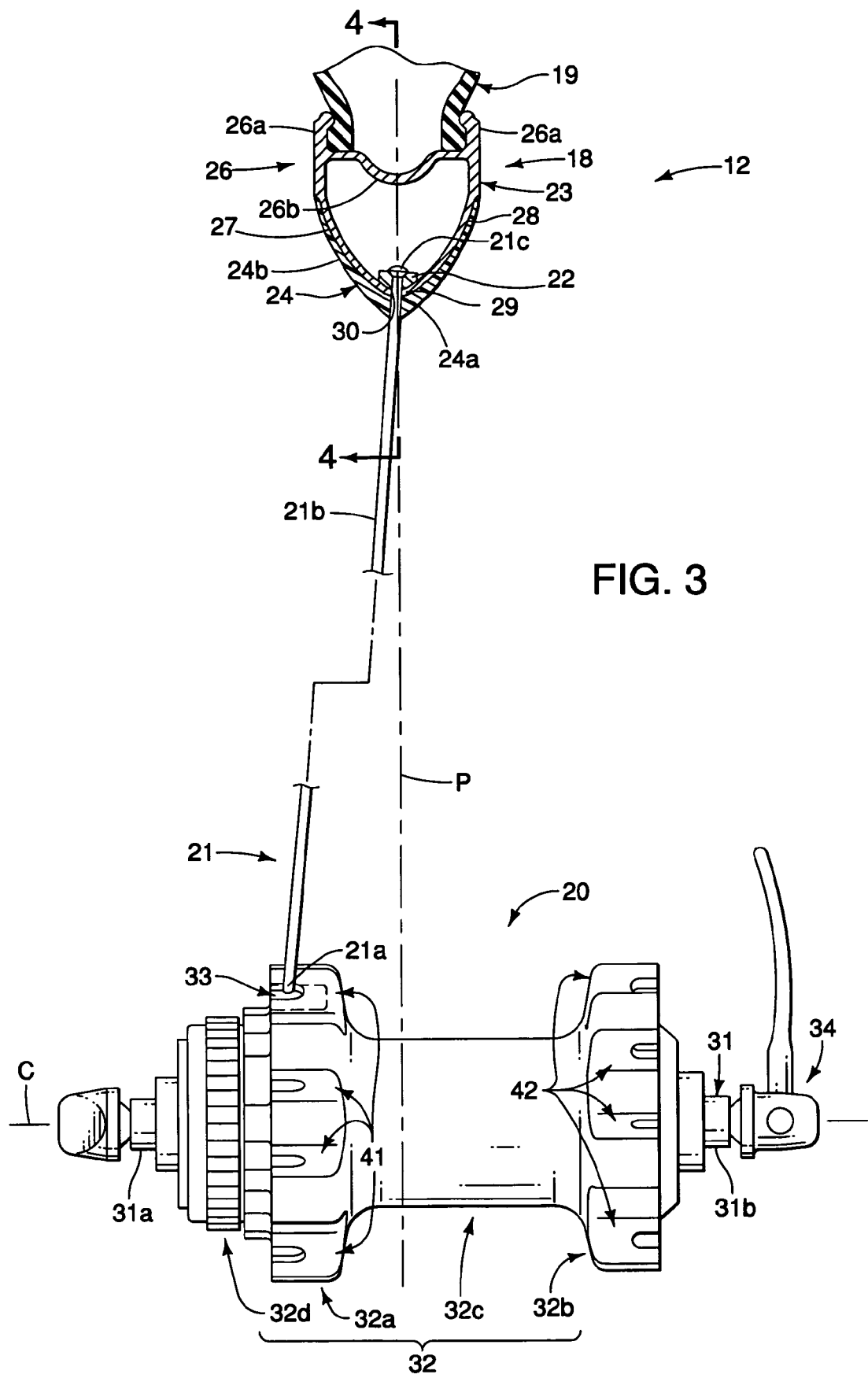
FIG. 3 is a partial rear end view of the front wheel illustrated in FIGS. 1 and 2 with the bicycle hub shown in elevation and the rim shown in transverse cross section.
Figure 6:
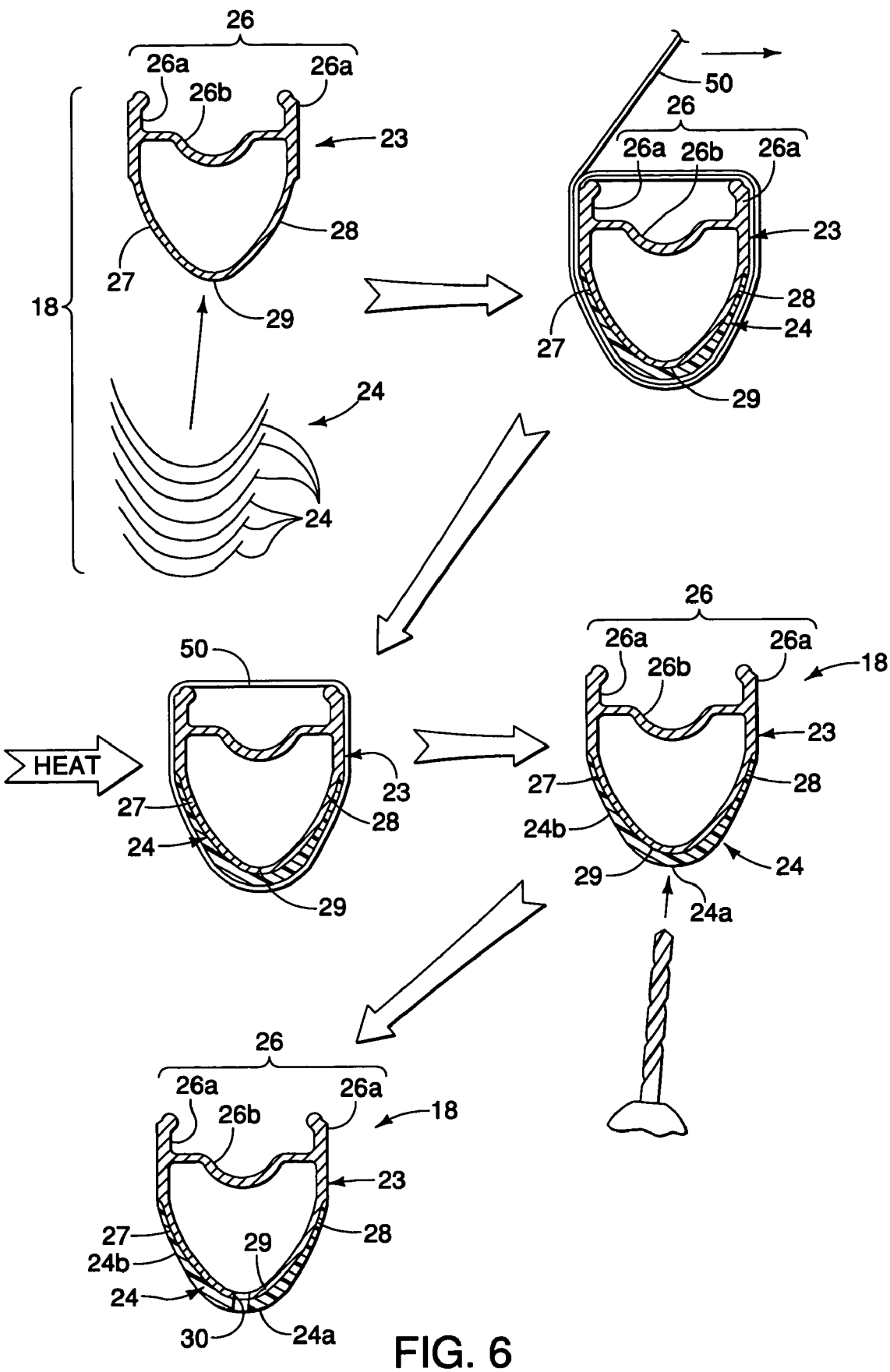
FIG. 6 is a series of cross sectional view showing a preferred method of manufacturing the rim illustrated in FIGS. 1-5 in accordance with the first embodiment of the present invention.
Figure 7:
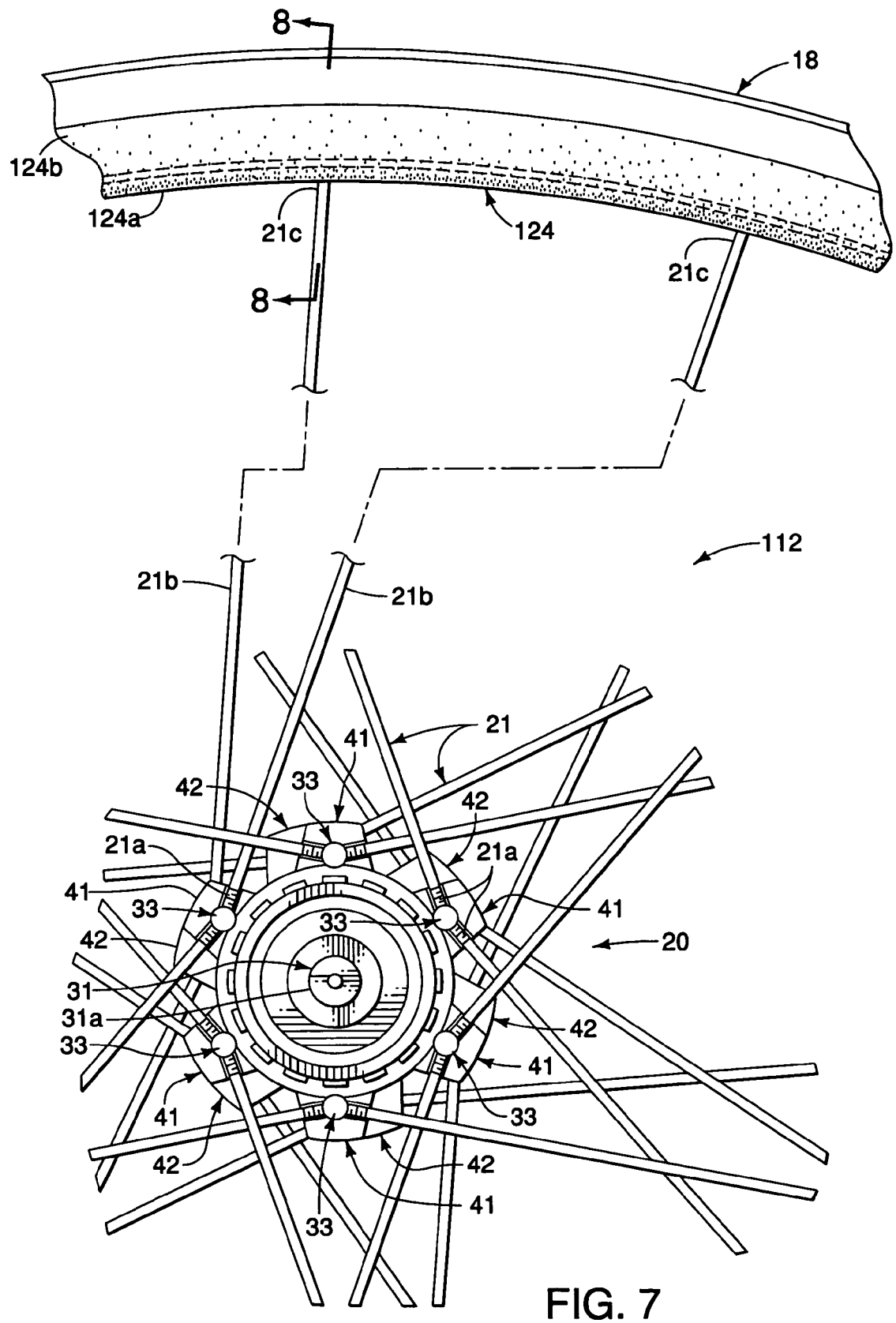
FIG. 7 is a partial side elevational view of the front wheel illustrated in FIG. 1 in accordance with a second embodiment of the present invention.
Figure 8:
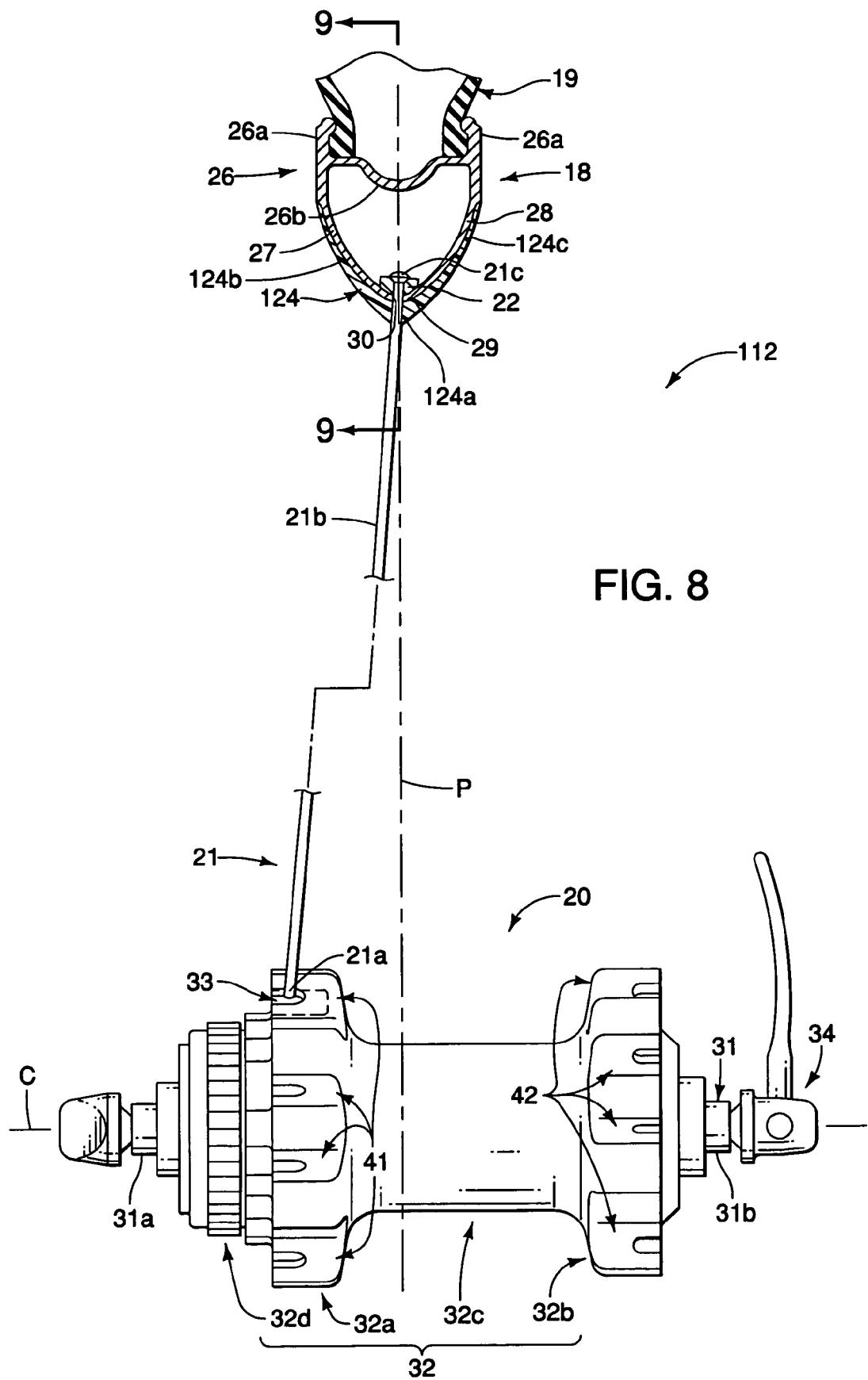
FIG. 8 is a partial rear end view of the front wheel illustrated in FIG. 7 with the bicycle hub shown in elevation and the rim shown in transverse cross section.

Still referring to FIGS. 2 and 3, the rim 18 is an annular member designed for rotation about a center axis C of the front bicycle wheel 12. In other words, the rim 18 is substantially circular as seen in side elevation (FIG. 1). The rim 18 basically includes an annular metallic rim member 23 with a reinforcing resin material 24 applied to the annular metallic rim member 23 at a plurality of individually discrete points about the circumference of the annular metallic rim member 23. In the illustrated embodiment, as seen in FIG. 6, the reinforcing resin material 24 is formed of a plurality of resin sheets 25 that are melted together. Preferably, the resin sheets 25 are fiber reinforced plastic sheets as discussed below. Thus, the rim 18 is a composite rim made of both metallic and non-metallic materials. The reinforcing resin material 24 is directly bonded to the annular metallic rim member 23. While heat is used to apply the resin sheets 25, the heat is lower than a temperature that would physical alter the metallic material of the annular metallic rim member 23.

The annular metallic rim member 23 is constructed of a substantially rigid material, such as those materials, which are well known in the art. For example, the annular metallic rim member 23 can be constructed of any suitable metallic material, such as plated steel, stainless steel, aluminum, magnesium or titanium. The annular metallic rim member 23 basically includes an annular tire attachment portion 26 adapted to have the tire 19 mounted thereon, a first annular side wall portion 27, a second annular side wall portion 28 and an inner annular wall portion 29 connecting the first and second annular side wall portions 27 and 28 with a plurality of spoke attachment openings 30 formed in the inner annular wall portion 29. Basically, the annular metallic rim member 23 has a uniform cross-sectional profile, except for that the wall portions 27, 28 and 29 have been made thinner, material has been removed to form a hole in the annular tire attachment portion 26 for an air filling valve (not shown) and material as been removed to form the spoke attachment openings 30. Preferably, the annular metallic rim member 23 is an extruded tube that has an initial wall thickness of about 2 millimeters with the wall thicknesses of the wall portions 27, 28 and 29 of the annular metallic rim member 23 being thinned down to preferably lie in a range of about 0.5 millimeters to about 0.8 millimeters. Transition sections are disposed at the radially innermost ends of the oppositely facing annular braking surfaces. Thus, the wall thicknesses of the first and second annular side wall portions 27 and 28 located radially outward of the transition sections are more than twice the wall thicknesses of the first and second annular side wall portions 27 and 28 located radially inward of the transition sections. The wall thicknesses of the wall portions 27, 28 and 29 can be made thinner because of the use of the reinforcing resin material 24 applied to the annular metallic rim member 23. If the reinforcing resin material 24 was not applied to the annular metallic rim member 23, then the wall thickness of the inner annular wall portion 29 at the spoke attachment openings 30 would be about 2 millimeters to obtain about the same strength.

Figure 4:
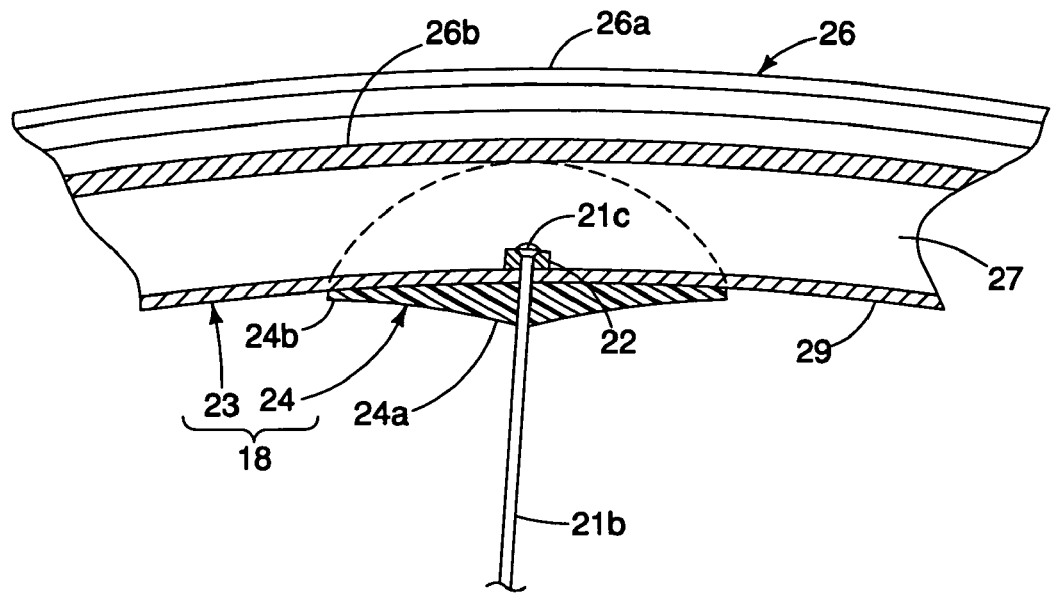
FIG. 4 is an enlarged cross sectional view of the rim of the front wheel illustrated in FIGS. 1-3 taken along section line 4-4 of FIG. 2.
Figure 5:
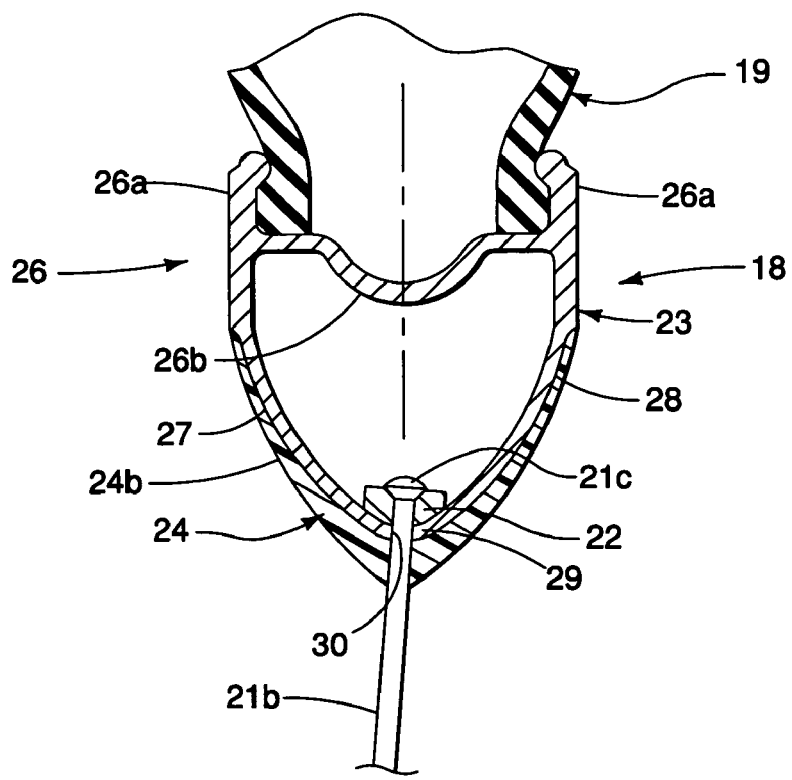
FIG. 5 is an enlarged cross sectional view of the rim of the front wheel illustrated in FIGS. 1-4 taken along section line 5-5 of FIG. 3.

As seen in FIGS. 2 and 4, the annular tire attachment portion 26 is an outer annular portion of the annular metallic rim member 23 that is configured and arranged to have the tire 19 mounted thereon in a conventional manner. The annular tire attachment portion 26 basically includes a pair of annular side sections 26a and an annular outer bridge or connecting section 26b. The annular connecting section 26b extends between the annular side sections 26a to form a substantially U-shaped tire receiving recess as seen in cross-section in FIG. 2. The annular side sections 26a are annular plate shaped members that form a pair of annular tire supporting surfaces and a pair of annular braking surfaces in a conventional manner. An external undercut surface (where the rim member 23 is thinner than at the oppositely facing annular braking surfaces) extends between the first and second oppositely facing annular braking surfaces, respectively. The external undercut surface has annular transition sections offsetting the external undercut surface from the oppositely facing annular braking surfaces, as best seen in FIGS. 3, 5 and 6. The annular transition sections are disposed immediately radially inwardly of the oppositely facing annular barking surfaces. Each of the annular transition sections of the external undercut surface has a concave shape as viewed in circumferential cross-section, as seen in FIGS. 3 and 5. The tire supporting surfaces of the annular side sections 26a are opposed annular surfaces that face each other toward the center plane P. The tire supporting surfaces have annular ribs formed at their free ends to retain beads of the tire 19 in a conventional manner. The annular braking surfaces of the annular side sections 26a face outwardly away from the center plane P to engage conventional rim brakes.

The annular connecting section 26b is a curved tubular member that includes a single valve aperture formed therein for coupling an air valve therein in a conventional manner. Thus, preferably, the annular connecting section 26b is free of openings, except for the single valve aperture such that the tire 19 can be a tubeless tire. However, it will be apparent to those skilled in the art from this disclosure that the tire 19 could be a tube-type tire, and that the valve aperture could receive the valve of the tube in a conventional manner.

The wall portions 27, 28 and 29 are coupled together to form an annular inner peripheral element of the metallic rim member having a U-shaped transverse cross-section that is disposed radially inwardly of the first and second oppositely facing annular braking surfaces. The upper ends of the annular side wall portions 27 and 28 are coupled to the lower ends of the annular side sections 26a of the annular tire attachment portion 26 to form a hollow interior radially inwardly of the annular connecting section 26b. Thus, the annular metallic rim member 23 is a tubular member. The annular metallic rim member 23 has an overall radial width measured radially between an outermost radial edge and an innermost radial edge of the annular metallic rim member as best understood from FIGS. 2-5. The spoke attachment openings 30 are evenly spaced about an innermost part of the circumference of the inner annular wall portion 29 for receiving the spokes 21 therein as best understood from FIG. 1. In the illustrated embodiment, the inner annular wall portion 29 has twenty-four of the spoke attachment openings 30 in order to attach a total of twenty-four spokes 21. Alternating ones of the spoke attachment openings 30 can be preferably slightly angled in opposite axial directions relative to a rim center plane so that the spokes 21 coupled thereto extend to opposite ends of the hub 20. Preferably, the spokes 21 are coupled between the hub 20 and the inner annular wall portion 29 so that the wheel 12 is dished, i.e., the rim 18 is offset from the center of the hub 22 towards one end.

The reinforcing resin material 24 is attached to the annular metallic rim member 23 such that the reinforcing resin material continuously extends from the first annular side wall portion 27 across the inner annular wall portion 29 to the second annular side wall portion 28 to overlie exterior surface areas of the first and second annular side wall portions 27 and 28 and exterior surface areas of the inner annular wall portion 29 around the spoke attachment openings 30. Thus, the reinforcing resin material 24 overlaps all of the inner peripheral element (i.e., the first and second annular side wall portions 27 and 28 and the inner annular wall portion 29) in a radial direction at the spoke attachment openings 30, as best seen in FIGS. 2-5. The reinforcing resin material 24 extends radially to overlie the annular metallic rim member 23 at the spoke attachment openings 30 without overlying the oppositely facing annular braking surfaces, as best seen in FIGS. 2-5. The reinforcing resin material 24 overlies the annular transition sections of the external undercut surface at the spoke attachment openings 30 such that an external surface of the reinforcing resin material is aligned with the first and second oppositely facing annular braking surfaces to form a smooth transition therebetween, as seen in FIGS. 3 and 5. The reinforcing resin material 24 effectively increases the thickness of the inner annular wall portion 29 at the spoke attachment openings 30 to provide rigid reinforcement to the rim 18.

As mentioned above, the reinforcing resin material 24 includes a plurality of individual or discrete sections that are circumferentially spaced apart about the annular metallic rim member 23 that corresponds to the spoke attachment openings 30. Each of the individual sections of the reinforcing resin material 24 is preferably identical in shape and construction. Of course, the individual sections of the reinforcing resin material 24 can be slightly different if needed and/or desired for a particular application. In the illustrated embodiment, as seen in FIG. 6, the reinforcing resin material 24 is formed of the resin sheets 25 that are melted together to form a plurality of integrated one-piece reinforcements. Preferably, the resin sheets 25 are fiber reinforced plastic sheets that includes epoxy with one or more carbon impregnated layers. Preferably, each of the individual sections of the reinforcing resin material 24 is generally an elongated oval member that has a center part 24a located at a corresponding one of the spoke attachment openings 30 and a peripheral edge part 24b that encircles the center part 24a. The center part 24a has an overall maximum thickness in a range of about 1 millimeter to about 2 millimeters, while the peripheral edge part 24b tapers down from the center part 24a to a thickness of about 0.5 millimeter at its outer edge. Due to the arrangement of the annular transition sections of the undercut surface, a combined thickness of the reinforcing resin material 24 and the first annular side wall portion 27 at the external undercut surface is about the same as a thickness of the first annular side wall portion 27 at the adjacent annular facing braking surface, and a combined thickness of the reinforcing resin material 24 and the second annular side wall portion 28 at the external undercut surface is about the same as a thickness of the second annular side wall portion 28 at the adjacent annular facing braking surface. Accordingly, the resin sheets 25 are configured and arranged as a plurality of reinforcing layers that are adhesively attached together such that the reinforcing resin material 24 has outer peripheral edges that are thinner than areas of the reinforcing resin material 24 surrounding the spoke attachment openings 30.

The resin sheets 25 in this first embodiment are preferably thin sheets of continuous reinforcement fibers impregnated with a thermoset resin or a thermoplastic resin, which are often called prepreg sheets. The resin sheets 25 (prepreg sheets) are soft material at room temperature. However, when the resin sheets 25 (prepreg sheets) are heated, the resin once becomes low viscosity. However, after that the resin of the resin sheets 25 becomes very hard, e.g., solid at 130° C.-150° C. In the one preferred embodiment, the resin sheets 25 (prepreg sheets) include carbon fibers or a glass fiber impregnated with an epoxy resin. In other preferred embodiments, the resin sheets 25 (prepreg sheets) can include virtually any reinforcement fiber, with virtually any matrix resin that can carry out the present invention. The thickness and surface finish of the resin sheets 25 (prepreg sheets) can be varied to suit the desired requirements of the wheel. In this embodiment, seven of the resin sheets 25 are illustrated as being used to cover an entire circumferential section of the inner annular wall portion 29 that includes all of the reinforcement members 23. However, the number of the resin sheets 25 will depend on a number of factors. Thus, seven of the resin sheets 25 are shown just for purposes of illustration (i.e., the actual number of sheets can be more or less than shown depending on a number of factors).

Referring to FIGS. 2 and 3, the hub 20 will now be discussed in more detail. The hub 20 basically includes an axle 31 with a hub shell or body 32 disposed about the axle 31 in a rotatable manner by a pair of bearings in a conventional manner. The hub 20 further includes a plurality of spoke securing elements 33 for securing the spokes 21. The other parts of the hub 20, other than the hub shell or body 32 and the spoke securing elements 33, are relatively conventional for the purposes of the present invention. Thus, these other parts of the hub 20 will not be discussed or illustrated in detail herein.

The axle 31 is a hard rigid member that has a pair of opposite free ends 31a and 31b extending outwardly from the hub shell 32. The free ends 31a and 31b of the axle 31 are fixedly coupled the frame 16 via a quick release device 34 in a conventional manner. The axle 31 has a center axis C that defines the center axis of the wheel 12.

As best seen in FIG. 2, the hub shell 32 is a hard rigid tubular member that is rotatably supported on the axle 31. The hub shell 32 includes a first spoke mounting portion 32a, a second spoke mounting portion 32b and a tubular center portion 32c disposed between the mounting portions 32a and 32b. Thus, the spoke mounting portions 32a and 32b are disposed at opposite ends of the hub shell 32. The spoke mounting portions 32a and 32b are configured and arranged to fixedly secure the spokes 21 thereto. The spoke mounting portions 32a and 32b are preferably mirror images of each other as shown, except that the spoke mounting portion 32a is circumferentially offset from the spoke mounting portion 32b. Of course, the spoke mounting portions 32a and 32b do not need to be mirror images of each other if needed and/or desired. Optionally, the hub shell 32 is also provided with a brake mounting portion 32d for attaching a disc brake rotor (not shown). The optional disc brake rotor (not shown) can be attached to the hub shell 32 by a retaining or locking ring that is threaded into on the end of the hub shell 32 such as disclosed in U.S. Pat. No. 6,371,252 to Kanehisa (Assigned to Shimano, Inc.).

The spoke mounting portion 32a includes a plurality (six) of individual spoke fixing parts or protrusions 41 that extend outwardly in a radial manner from one end of the hub shell 32. The spoke fixing parts 41 are equally spaced apart in a circumferential direction around the main body of the spoke mounting portion 32a. Each of the spoke fixing parts 41 is configured and arranged to fix a pair of the spokes 21 thereto using two of the spoke securing elements 33. Each of the spoke fixing parts 41 is preferably identical as shown. Of course, the spoke fixing parts 41 do not need to be identical if needed and/or desired.

Likewise, the mounting portion 32b includes a plurality (six) of individual spoke fixing parts or protrusions 42 that extend outwardly in a radial manner from one end of the hub shell 32. The spoke fixing parts 42 are equally spaced apart in a circumferential direction around the main body of the spoke mounting portion 32b. The spoke fixing parts 42 are preferably offset mirror images of the spoke fixing parts 41. In other words, the spoke fixing parts 42 are circumferentially offset from the spoke fixing parts 41 by an acute angle such as 15° and face in the opposite axial direction from the spoke fixing parts 41 as seen in FIGS. 2 and 3.

Each of the spoke fixing parts 42 is configured and arranged to fix a pair of the spokes 21 thereto using one of the spoke securing elements 33. Each of the spoke fixing parts 42 is preferably identical as shown. Of course, the spoke fixing parts 42 do not need to be identical if needed and/or desired. Thus, the spoke fixing parts or protrusions 41 and 42 of the hub shell 32 are individual radial projections that are circumferentially spaced apart about opposite ends of the hub shell 32.

The spokes 21 are tension spokes that interconnect the hub 20 and the rim 18 together as explained below. In the illustrated embodiment, the front bicycle wheel 12 includes twenty-four of the spokes 21 that extend generally tangentially from the hub 20 to the rim 18. Also, in the illustrated embodiment, the spokes 21 are coupled to the rim 18 at equally spaced circumferential locations as seen in FIG. 1. Of course, it will be apparent to those skilled in the art from this disclosure that the front bicycle wheel 12 could use a modified rim and/or hub in order to accommodate different spoking arrangements without departing from the scope of the present invention. Moreover, it will be apparent to those skilled in the art from this disclosure that the front bicycle wheel 12 could use a modified rim and/or hub in order to accommodate fewer or more spokes 21 if needed and/or desired. In any case, the spokes 21 are preferably coupled to the annular rim 18 in circumferentially spaced arrangement.

Referring now to FIGS. 2 and 3 the spokes 21 are preferably straight spokes that are identical to each other. Each of the spokes 21 basically includes a threaded inner end portion 21a, a straight center or a middle portion 21b and an outer headed end portion 21c. The portions 21a, 21b and 21c of each of the spokes 21 are preferably integrally formed together as a one piece, unitary member. The threaded inner end portions 21a of the spokes 16 are coupled to the hub 20, while the outer end portions 21c of the spokes 21 are coupled to the rim 18 via the adapters 29 mating with the reinforcement members 23. The spokes 21 are preferably wire-type spokes that are relatively conventional. Thus, the spokes 21 will not be discussed and/or illustrated in detail herein, except as related to the hub 20 of the present invention. While the outer headed end portion 21c is used that engages the washers 22, it will be apparent to those skilled in the art that the outer headed end portion 21c can be a threaded end with a spoke nipple attached thereto. In such a case, the spoke attachment openings 30 would be slightly larger in diameter to receive the spoke nipples Referring now to FIG. 6, a preferred method of manufacturing rim 18 will now be discussed. First, the annular metallic rim member 23 is formed utilizing conventional rim manufacturing techniques. For example, the annular metallic rim member 23 can be constructed by extruding a length of aluminum with the cross-sectional shape that includes the annular tire attachment portion 26, the side annular wall portions 27 and 28 and the inner annular wall portion 29. Next, the side annular wall portions 27 and 28 and the inner annular wall portion 29 are thinned so as to reduce the overall weight of the annular metallic rim member 23. Then, the aluminum extruded rim member is cut to the appropriate length and bent into a circular shape. The ends of the aluminum extruded rim member are then welded together.

Once the annular metallic rim member 23 is formed with the cross-sectional shape illustrated in FIGS. 3 and 5, the reinforcing resin material 24 applied is to the annular metallic rim member 23 at plurality of discrete locations where the spoke attachment openings 30 will be formed. In this embodiment, seven individual resin sheets 25 are used to form the reinforcing resin material 24 at plurality of discrete locations around the annular metallic rim member 23.

The application of the resin sheets 25 is accomplished by applying a heat shrink wrap material 50 over the resin sheets 25. Preferably, the heat shrink wrap material 50 is a tape that is spirally wound around the entire circumference of the annular metallic rim member 23 with a slight overlap between adjacent coils. Then heat is applied to the heat shrink wrap material 50 such that the heat shrink wrap material 50 firmly presses the resin sheets 25 against and the wall portions 27, 28 and 29. This application of the heat to the heat shrink wrap material 50 also causes the resin of the resin sheets 25 to melt and thus adhere to the wall portions 27, 28 and 29.

Now, the heat shrink wrap material 50 is removed to expose the reinforcing resin material 24 that has been bonded the annular metallic rim member 23 at plurality of discrete locations around the annular metallic rim member 23. Next, holes are formed in the reinforcing resin material 24 at each of the spoke attachment openings 30. As shown, a drill is used. However, it will be apparent to one skilled in the art that other methods of forming the holes in the reinforcing resin material 24 that correspond to each of the spoke attachment openings 30. Once the holes in the reinforcing resin material 24 have been formed, the rim 18 is ready to be attached to the hub 20 by the spokes 21 and the spoke securing elements 33 in the manner discussed above.

Second Embodiment

Referring now to FIGS. 7-10, a portion of a modified front wheel 112 is illustrated in accordance with a second embodiment of the present invention. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In other words, unless otherwise specified, the configuration of the rim 118 of the second embodiment is the same as the configuration of the first embodiment. Moreover, unless otherwise specified, the method of manufacturing the rim 118 of the second embodiment is the same as the configuration of the first embodiment.

Basically, the only difference between the first and second embodiments is the application of a reinforcing resin material 124 to the annular metallic rim member 23. In this second embodiment, the reinforcing resin material 124 is applied to the annular metallic rim member 23 to cover an entire circumferential section of the wall portions 27, 28 and 29. Thus, the reinforcing resin material 124 extends continuously about an entire circumferential area of the annular metallic rim member 23. The reinforcing resin material 124 basically has an annular center part 124a disposed on the inner annular wall portion 29 and a pair of peripheral edge parts 124b and 124c disposed on the side annular wall portions 27 and 28. The center part 124a has an overall maximum thickness in a range of about 1 millimeter to about 2 millimeters, while the peripheral edge parts 124b and 124c taper down from the center part 124a to a thickness of about 0.5 millimeter at its outer edges. Accordingly, the reinforcing resin material 124 is preferably formed of a plurality of the resin sheets (identical to resin sheets 25 but longer and wider so as to completely cover the wall portions 27, 28 and 29 of the annular metallic rim member 23). In other words, the reinforcing resin material 124 is configured and arranged as a plurality of reinforcing layers that are adhesively attached together to form an integrated one-piece reinforcement with the peripheral edge parts 124b and 124c of the reinforcing resin material 124 being thinner than the annular center part 124a the reinforcing resin material 124 that encompasses the spoke attachment openings 30.

Figure 9:
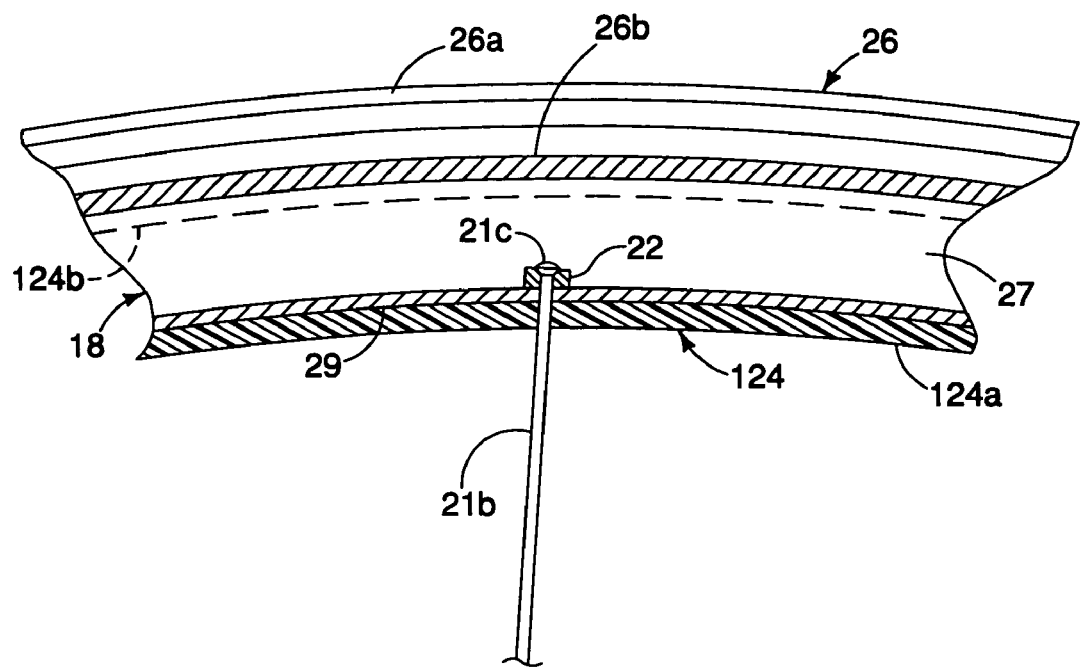
FIG. 9 is an enlarged cross sectional view of the rim of the front wheel illustrated in FIGS. 7 and 8 taken along section line 9-9 of FIG. 7.
Figure 10:
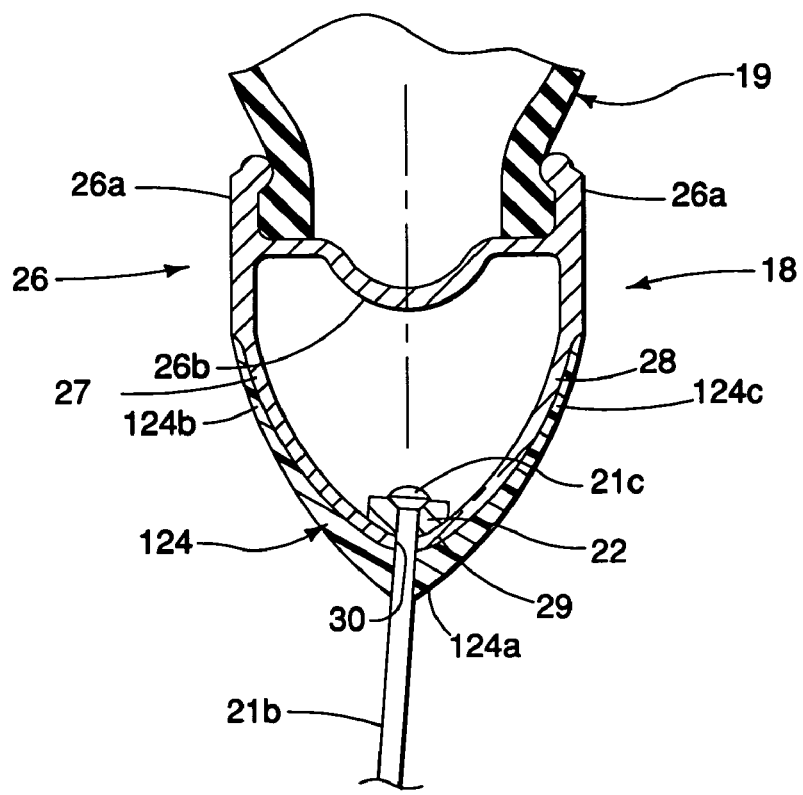
FIG. 10 is an enlarged cross sectional view of the rim of the front wheel illustrated in FIGS. 7-9 taken along section line 10-10 of FIG. 8.

As best seen in FIGS. 9 and 10, after the plurality of resin sheets (similar to those shown in FIG. 6) are melted together the reinforcing resin material 124 is a continuous annular reinforcement member that is bonded to the completely cover the entire circumferential area defined by the wall portions 27, 28 and 29 of the annular metallic rim member 23. Preferably, the resin sheets are fiber reinforced plastic sheets that includes epoxy with one or more carbon impregnated layers (i.e., the same as resin sheets of the first embodiment).

In manufacturing the modified front wheel 112, the reinforcing resin material 124 is formed and bonded to the annular metallic rim member 23 in the same manner as discussed above and shown in FIG. 6. Thus, the heat shrink wrap material 50 is spirally wound around the plurality of reinforcing layers or resin sheets and the entire circumference of the annular metallic rim member 23 with a slight overlap between adjacent coils. Thus, the heat shrink wrap material 50 will hold the reinforcing layers or resin sheets against the wall portions 27, 28 and 29 of the annular metallic rim member 23.

Next, as in the first embodiment, heat is applied to the heat shrink wrap material 50 such that the heat shrink wrap material 50 firmly presses the reinforcing layers or resin sheets against the wall portions 27, 28 and 29 of the annular metallic rim member 23. This application of the heat to the heat shrink wrap material 50 also causes the resin of reinforcing layers or resin sheets to melt, and thus, adhere to the wall portions 27, 28 and 29 of the annular metallic rim member 23.

General Interpetation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rim comprising:
   an annular metallic rim member including an annular tire attachment portion adapted to have a tire mounted thereon, a first annular side wall portion, a second annular side wall portion and an inner annular wall portion connecting the first and second annular side wall portions being formed of an extruded metallic material, with a plurality of spoke attachment openings formed in the inner annular wall portion, the first and second annular side wall portions having first and second annular braking surfaces that face in opposite directions and an external undercut surface extending between the first and second annular braking surfaces, respectively, the external undercut surface having annular transition sections offsetting the external undercut surface from the first and second annular braking surfaces; and a reinforcing resin material having a rim facing surface attached to the annular metallic rim member such that the reinforcing resin material continuously extends from the first transition section across the inner annular wall portion to the second transition section to overlie exterior surface areas of the first and second annular side wall portions and exterior surface areas of the inner annular wall portion around the spoke attachment openings without overlying the first and second annular braking surfaces, the reinforcing resin material continuously overlying the annular transition sections of the external undercut surface about an entire circumferential area of the annular metallic rim member, and the rim facing surface of the reinforcing resin material being entirely directly attached to the extruded metallic material of the annular metallic rim member.

2. The bicycle rim according to claim 1, wherein the reinforcing resin material overlies the annular transition sections such that an external surface of the reinforcing resin material is aligned with the first and second annular braking surfaces to form a smooth transition therebetween.

3. The bicycle rim according to claim 2, wherein the first and second annular side wall portions have thicknesses smaller at the external undercut surface than at the first and second annular braking surfaces.

4. The bicycle rim according to claim 3, wherein a combined thickness of the reinforcing resin material and the first annular side wall portion at the external undercut surface is about the same as a thickness of the first annular side wall portion at the first annular braking surface, and a combined thickness of the reinforcing resin material and the second annular side wall portion at the external undercut surface is about the same as a thickness of the second annular side wall portion at the second annular braking surface.

5. The bicycle rim according to claim 1, wherein the first and second annular side wall portions have thicknesses smaller at the external undercut surface than at the first and second annular braking surfaces.

6. The bicycle rim according to claim 1, wherein each of the first and second annular transition sections of the external undercut surface has a concave shape as viewed in circumferential cross-section.

7. The bicycle rim according to claim 1, wherein the reinforcing resin material is formed of a plurality of reinforcing layers that are adhesively attached together such that the reinforcing resin material has outer peripheral edges that are thinner than areas of the reinforcing resin material surrounding the spoke attachment openings.

8. The bicycle rim according to claim 1, wherein the reinforcing resin material includes epoxy with one or more carbon impregnated layers.

9. The bicycle rim according to claim 1, wherein the reinforcing resin material has an overall maximum thickness in a range of about 1 millimeter to about 2 millimeters.

10. A bicycle rim comprising:

an annular metallic rim member including an annular tire attachment portion adapted to have a tire mounted thereon, a first annular side wall portion, a second annular side wall portion and an inner annular wall portion connecting the first and second annular side wall portions being formed of an extruded metallic material, with a plurality of spoke attachment openings formed in the inner annular wall portion, the annular metallic rim member having first and second annular braking surfaces that face in opposite directions and first and second transition sections formed in the first and second annular side wall portions radially inward of the first and second annular braking surfaces, the first and second annular side wall portions and the inner annular wall portion having wall thicknesses that are thinner in areas located radially inward of the first and second transition sections than wall thicknesses of the first and second annular side wall portions located radially outward of the first and second transition sections; and a reinforcing resin material having a rim facing surface attached to the annular metallic rim member such that the reinforcing resin material continuously extends from the first transition section across the inner annular wall portion to the second transition section to overlie exterior surface areas of the first and second annular side wall portions and exterior surface areas of the inner annular wall portion around the spoke attachment openings without overlying the first and second annular braking surfaces, the reinforcing resin material continuously overlying an entire circumferential area of the annular metallic rim member, and the rim facing surface of the reinforcing resin material being entirely directly attached to the extruded metallic material of the annular metallic rim member.

11. The bicycle rim according to claim 10, wherein the wall thicknesses of the first and second annular side wall portions located radially outward of the first and second transition sections are more than twice the wall thicknesses of the first and second annular side wall portions located radially inward of the first and second transition sections.

12. The bicycle rim according to claim 10, wherein a combined thickness of the reinforcing resin material and the first annular side wall portion at the external undercut surface is about the same as a thickness of the first annular side wall portion at the first annular braking surface, and a combined thickness of the reinforcing resin material and the second annular side wall portion at the external undercut surface is about the same as a thickness of the second annular side wall portion at the second annular braking surface.

13. The bicycle rim according to claim 10, wherein the reinforcing resin material radially overlies the annular transition sections such that an external surface of the reinforcing resin material is aligned with the first and second annular braking surfaces to form a smooth transition therebetween.

14. The bicycle rim according to claim 10, wherein the reinforcing resin material is formed of a plurality of reinforcing layers that are adhesively attached together such that the reinforcing resin material has outer peripheral edges that are thinner than areas of the reinforcing resin material surrounding the spoke attachment openings.

15. The bicycle rim according to claim 10, wherein the reinforcing resin material includes epoxy with one or more carbon impregnated layers.

16. The bicycle rim according to claim 10, wherein the reinforcing resin material has an overall maximum thickness in a range of about 1 millimeter to about 2 millimeters.

\* \* \* \* \*